US012757032B2

(12) United States Patent
Trujillo et al.

(10) Patent No.: US 12,757,032 B2
(45) Date of Patent: Oct. 6, 2026

(54) HYBRID CLOUD CELLULAR NETWORK ROUTING

(71) Applicant: Boost SubscriberCo LLC, Englewood, CO (US)

(72) Inventors: Andrew Trujillo, Littleton, CO (US); Sourabh Gupta, Ashburn, VA (US); Sundeep Goswami, Leesburg, VA (US); Julio Armenta, Aldie, VA (US); Ash Khamas, Goffstown, NH (US)

(73) Assignee: Boost SubcsriberCo L.L.C., Englewood, CO (US)

( * ) Notice: Subject to any disclaimer, the term of this patent is extended or adjusted under 35 U.S.C. 154(b) by 500 days.

(21) Appl. No.: 17/960,488

(22) Filed: Oct. 5, 2022

(65) Prior Publication Data

US 2023/0103816 A1 Apr. 6, 2023

Related U.S. Application Data

(60) Provisional application No. 63/252,942, filed on Oct. 6, 2021.

(51) Int. Cl.
*H04W 16/24* (2009.01)
*H04L 9/40* (2022.01)
(Continued)

(52) U.S. Cl.
CPC ......... *H04W 16/24* (2013.01); *H04L 41/0895* (2022.05); *H04L 45/50* (2013.01);
(Continued)

(58) Field of Classification Search
CPC ... H04W 16/24; H04W 4/90; H04W 28/0861; H04W 40/02; H04W 48/18; H04W 88/16;
(Continued)

(56) References Cited

U.S. PATENT DOCUMENTS 10,555,165 B2 2/2020 Shekhar et al.
10,805,171 B1 10/2020 Anwer et al.
(Continued)

FOREIGN PATENT DOCUMENTS

CN 107787571 A 3/2018

OTHER PUBLICATIONS

International Search Report and Written Opinion for PCT/US2022/045861 mailed Mar. 6, 2023, all pages.
(Continued)

*Primary Examiner* — Nicholas A Jensen
*Assistant Examiner* — Oladiran Gideon Olaleye
(74) *Attorney, Agent, or Firm* — Kilpatrick Townsend & Stockton LLP

(57) ABSTRACT

Various arrangements of hybrid cloud cellular networks are presented. A hybrid cloud cellular network can include multiple base stations, each base station including a radio unit (RU); a router; and a distributed unit (DU). The network can include a cellular network cluster that includes multiple network functions. The cellular network cluster can be implemented on a cloud computing platform and communicates with the DUs of the base stations. The cluster can include a virtual router that receives traffic from the cellular network cluster and the virtual router is configured to analyze a label of each packet of the received cellular network data traffic. The virtual router can prioritize routing of packets of the received data traffic on the cloud computing platform based on the label of each packet.

14 Claims, 7 Drawing Sheets

(51) Int. Cl.

| | |
|---|---|
| ***H04L 41/0895*** | (2022.01) |
| ***H04L 45/50*** | (2022.01) |
| ***H04L 45/586*** | (2022.01) |
| ***H04L 45/76*** | (2022.01) |
| ***H04L 47/125*** | (2022.01) |
| ***H04W 4/90*** | (2018.01) |
| ***H04W 28/086*** | (2023.01) |
| ***H04W 40/02*** | (2009.01) |
| ***H04W 48/18*** | (2009.01) |
| ***H04W 88/16*** | (2009.01) |

(52) U.S. Cl.
CPC ............ *H04L 45/586* (2013.01); *H04L 45/76* (2022.05); *H04L 47/125* (2013.01); *H04L 63/0272* (2013.01); *H04W 4/90* (2018.02); *H04W 28/0861* (2023.05); *H04W 40/02* (2013.01); *H04W 48/18* (2013.01); *H04W 88/16* (2013.01)

(58) Field of Classification Search
CPC ... H04L 41/0895; H04L 45/50; H04L 45/586; H04L 45/76; H04L 47/125; H04L 63/0272; H04L 41/40
USPC .......................................................... 370/328
See application file for complete search history.

(56) References Cited

U.S. PATENT DOCUMENTS

| | | | |
|---|---|---|---|
| 2004/0174900 A1 | 9/2004 | Volpi et al. | |
| 2012/0259970 A1 | 10/2012 | Hu et al. | |
| 2016/0080172 A1 | 3/2016 | Uberoy et al. | |
| 2017/0339600 A1 | 11/2017 | Roeland et al. | |
| 2020/0125389 A1* | 4/2020 | Palermo | H04W 28/084 |
| 2020/0136911 A1 | 4/2020 | Assali et al. | |
| 2020/0273314 A1 | 8/2020 | Bordeleau et al. | |
| 2021/0044567 A1* | 2/2021 | Hu | H04L 63/20 |
| 2021/0135957 A1 | 5/2021 | Thakkar et al. | |
| 2021/0168653 A1 | 6/2021 | Arnold et al. | |
| 2021/0204200 A1* | 7/2021 | Krishan | H04W 4/50 |
| 2021/0274266 A1* | 9/2021 | Lohmar | H04L 65/611 |
| 2021/0329098 A1 | 10/2021 | Rodrigo et al. | |
| 2021/0351997 A1 | 11/2021 | Luft et al. | |
| 2022/0078091 A1 | 3/2022 | Qiu et al. | |
| 2022/0103985 A1* | 3/2022 | Khasnabish | H04W 4/50 |
| 2022/0272043 A1 | 8/2022 | Mishra et al. | |
| 2022/0311744 A1* | 9/2022 | Shevade | H04L 61/5007 |
| 2024/0031908 A1* | 1/2024 | Grewal | H04L 45/741 |
| 2024/0196319 A1 | 6/2024 | Nakazato et al. | |
| 2024/0205522 A1 | 6/2024 | Spaas et al. | |
| 2024/0276301 A1 | 8/2024 | Zhu et al. | |
| 2024/0323089 A1 | 9/2024 | Baba | |

OTHER PUBLICATIONS

International Search Report and Written Opinion for PCT/US2022/045859 mailed Jan. 13, 2023, all pages.
International Search Report and Written Opinion for PCT/US2022/045863 mailed Mar. 10, 2023, all pages.
M. Ivezic, "Introduction to 5G Core Service-Base Architecture Components", pp. 1-23, Sep. 27, 2020.
"Discussion on Context data stored in UDR", 3GPP TSG CT4 Meeting #83, Montreal CA, Feb. 26-Mar. 2, 2018, Doc No. C4-182061, pp. 1-2 (Year: 2018).
"Cloud Platform Reference Designs," O-RAN.WG6.CLOUD-REF-v02.00, Technical Specification, 2020, 43 pages.
"O-RAN Working Group 1 Study on O-RAN Slicing," O-RAN.WG1.Study-on-O-RAN-Slicing-v02.00, Technical Report, 2020, 29 pages.
"Amazon Virtual Private Cloud: User Guide", Available online at: https://web.archive.org/web/20170121164746/https://docs.aws.amazon.com/AmazonVPC/latest/ UserGuide/vpc-ug.pdf, 2017, pp. 1-279.

* cited by examiner

HYBRID CLOUD CELLULAR NETWORK ROUTING

CROSS REFERENCES TO RELATED APPLICATIONS

This Application claims priority to U.S. Prov. Pat. No. 63/252,942, filed on Oct. 6, 2021, entitled "Cellular Network Virtualization using Cloud Platforms," the entire disclosure of which is hereby incorporated by reference for all purposes.

BACKGROUND

On a conventional cellular network, specialized hardware can be used to perform individual functions of the cellular network. With the advent of open radio access networks (O-RAN) and virtualization, cellular network functions can be executed on general-purpose computing platforms.

SUMMARY

Various embodiments are described related to a hybrid cloud cellular network. In some embodiments, a hybrid cloud cellular network is described. The network may comprise a plurality of base stations. Each base station of the plurality of base stations may comprise a radio unit (RU), a router, and a distributed unit (DU). The network may comprise a cellular network cluster comprising a plurality of network functions. The cellular network cluster may be implemented on a cloud computing platform and may communicate with a plurality of DUs of the plurality of base stations. The cellular network cluster may comprise a virtual router that receives traffic (e.g., one or more data packets) from the cellular network cluster. The virtual router may be configured to analyze a label of each packet of the received cellular network data traffic. The virtual router may prioritize routing of packets of the received data traffic on the cloud computing platform based on the label of each packet.

Embodiments of such a network may include one or more of the following features: the virtual router may comprise a prioritization engine configured to analyze the received traffic. The virtual router may comprise a prioritization engine configured to prioritize a portion of the traffic based on an assigned priority of the portion of the traffic. Prioritizing the portion of the traffic may comprise delivering the portion of the traffic ahead of a second portion of the traffic. The assigned priority may be based on the portion of the traffic corresponding to a wireless 911 call. The virtual router may comprise a routing table that defines where traffic is to be routed based on a characteristic of the traffic. The virtual router may be configured to use multiprotocol label switching (MPLS) to route the traffic. The virtual router may be further configured to use generic routing encapsulation between the virtual router and a second virtual router located in a second cellular network cluster on the cloud computing platform. The virtual router may be implemented as code that is loaded by a cellular network operator onto the cloud computing platform, the code being mapped to a user account of the cellular network operator with the cloud computing platform. The cellular network cluster may be a logical national data center (NDC) of the hybrid cloud cellular network. The cellular network cluster may be a logical regional data center (RDC) of the hybrid cloud cellular network. The network may comprise a second cellular network cluster comprising a second plurality of network functions. The second cellular network cluster may be implemented on the cloud computing platform. The second cellular network cluster may comprise a second virtual router. The second virtual router may be configured to receive data traffic from the virtual router via the cloud computing platform. The second virtual router may be configured to reformat the received data traffic. The second virtual router may be configured to output the reformatted received data traffic to the second cellular network cluster. The hybrid cloud cellular network may be a 5G New Radio (NR) radio access technology (RAT) cellular network.

In some embodiments, a method for implementing an overlay network on a public cloud computing platform is described. The method may comprise creating a plurality of virtual routers executed at different data centers of a public cloud computing platform. The method may comprise receiving data by a first virtual router of the plurality of virtual routers. The method may comprise formatting the received data for transmission to a different data center of the public cloud computing platform by applying a label that defines a path to a network function (NF) at the different data center. The method may comprise receiving the formatted data by a second virtual router of the plurality of virtual routers located at the different data center. The method may comprise reformatting the received formatted data by the second virtual router for use by the NF executed at the different data center.

Embodiments of such a method may include one or more of the following features: the overlay network may function as part of a 5G New Radio (NR) cellular network that may be partially implemented on the public cloud computing platform. Each virtual router of the plurality of virtual routers may use generic routing encapsulation (GRE) to create GRE tunnels with other virtual routers of the plurality of virtual routers.

In some embodiments, a hybrid cellular network system is described. The system may comprise a public cloud computing platform. The system may comprise a plurality of virtual routers executed on the public cloud computing platform. The system may comprise a cellular network local data center comprising a physical router. The system may comprise a radio access network (RAN) of a cellular network, comprising a plurality of base stations. Each base station of the plurality of base stations may comprise a physical router. Each physical router of the plurality of base stations can communicate with the virtual router executed on the cloud computing platform via the physical router of the local data center.

Embodiments of such a system may include one or more of the following features: the plurality of virtual routers may be executed in a plurality of virtual private clouds on the public cloud computing platform. Each virtual router of the plurality of virtual routers may perform routing using multiprotocol label switching (MPLS). Each virtual router of the plurality of virtual routers may prioritize routing of data packets based on a priority specified in a label of the packet. A first virtual router of the plurality of virtual routers that receives a data packet from a cellular network function executed in a national data center on the public cloud computing platform may create a label defining a path for routing of the data packet. The national data center may be executed across a plurality of availability zones of the public cloud computing platform.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
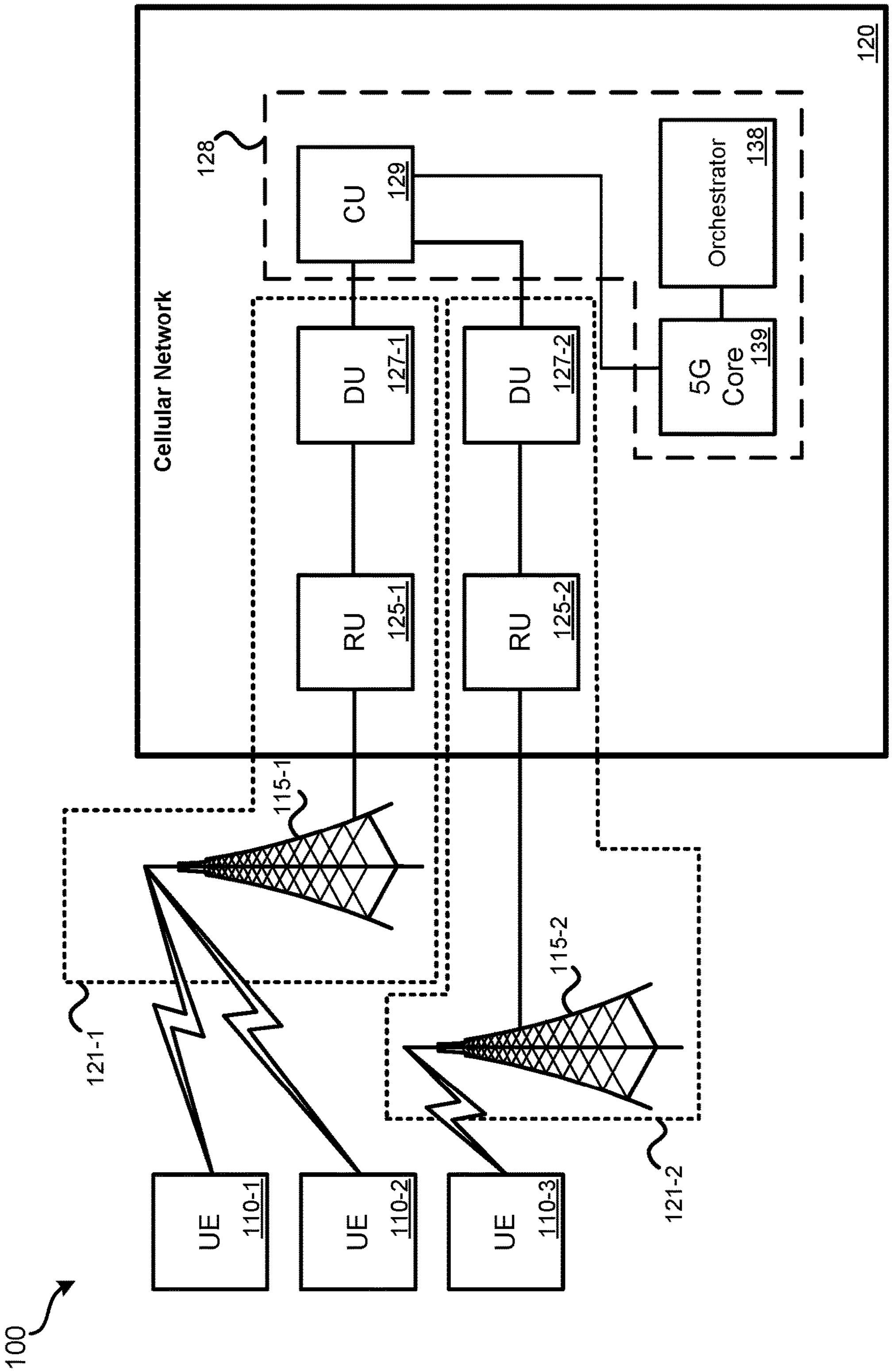
FIG. 1 illustrates an embodiment of a hybrid cloud cellular network.

Historically, cellular networks were implemented on physical networks that used specialized hardware to execute network functions. For example, on a 5G New Radio (NR) cellular network, one of the components used is a centralized unit (CU). The CU functions as part of the radio access network (RAN) and provides support for various high layers of the protocol stack, Packet Data Convergence (PDC), and Radio Resource Control (RRC). Conventionally, specialized pieces of hardware can be used to implement the functionality of instances of CUs on the cellular network. In contrast, as detailed herein, a hybrid cloud cellular network may be implemented instead. On a hybrid cloud cellular network, various RAN functions continue to use specialized hardware, such as radio units (RUs). However, virtualization allows for various other components of the cellular network, such as cellular network core functions, to be implemented as code that is executed using general-purpose computing resources. Such general-purpose computing resources can be part of a public cloud-computing platform that provides virtual private clouds (VPCs) for multiple clients. On a hybrid cloud cellular network, RAN components of the cellular network are in communication with components of the cellular network executed on a public cloud computing platform, such as Amazon Web Services (AWS).

The public cloud computing platform used to implement the hybrid cloud cellular network may be operated by a separate cloud computing provider that provides access to computing resources for many clients, each client being associated with one or more accounts maintained by the provider. Each client has control over their own virtual private cloud (or multiple virtual private clouds) on the public cloud computing platform. While the cellular network operator has control over the code and configuration of virtualized components that are executed on the cellular network operator's behalf on its virtual private cloud on the public cloud-computing platform, hardware of the cloud computing platform is maintained and controlled by the public cloud computing platform provider. While on a physical cellular network, routers and switches directly controlled and maintained by the cellular network operator are used to route cellular network traffic based on rules that have been set at the routers and switches, such an arrangement involving physical routers and switches is not available to the cellular network operator on a third-party cloud computing platform. Rather, the cloud computing platform's native routing capabilities may need to be used by the hybrid cloud cellular network.

While the public cloud computing platform's native routing capabilities can be used directly by components of the hybrid cloud cellular network, such native routing capabilities may lack certain functionalities, compatibilities, protocols, and/or features that are vital to operating a telecommunications network. For example, for a cellular network, certain traffic may be required to be prioritized, such as 911 calls and AMBER alerts. Such prioritized routing may not exist on public cloud computing platforms. Since such prioritization may be required by law or regulation, for a hybrid cloud cellular network to be implemented, the inability to prioritize traffic needs to be overcome. In order to overcome such a limitation and possibly others, an overlay routing network can be constructed on the virtualized portion of the hybrid cloud cellular network. The overlay routing network includes various virtual routers that operate on top of the cloud computing platform's underlying hardware that supersedes the routing architecture of the public cloud computing platform. By operating an overlay routing network on the hybrid cloud cellular network, the cellular network operator can implement and use desired functionalities, compatibilities, protocols, and/or features that would otherwise be unavailable on the public cloud computing platform.

Further detail regarding such embodiments and other embodiments are provided in relation to the figures. FIG. 1 illustrates a block diagram of a hybrid cellular network system ("system 100"). Such a hybrid cellular network system is partially implemented using specialized hardware and partially implemented using virtualized cellular network components on any public cloud computing platform, such as Amazon Web Services (AWS). Such platforms are hereinafter referred to as a cloud computing platform for simplicity. System 100 can include a 5G New Radio (NR) cellular network; as noted, other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In a virtualized open radio access network (O-RAN), because components can be implemented as specialized software executed on general-purpose hardware, except for components that need to receive and transmit RF, the functionality of the various components can be executed by general-purpose servers. For at least some components, the hardware may be maintained by a separate cloud-service computing platform provider. Therefore, the cellular network operator may operate some hardware, such as base stations that include RUs and local computing resources on which DUs are executed, such components may be connected with a cloud-computing platform on which other cellular network functions, such as the cellular network core and higher-level RAN components, such as CUs, are executed.

UE 110 can represent various types of end-user devices, such as cellular phones, smartphones, cellular modems, cellular-enabled computerized devices, sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G cores 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where 5G core 139 is executed, while other functions are executed at a separate server system or on a separate cloud computing system. In the illustrated embodiment of system 100, cloud-computing platform 128 can execute CU 129, 5G core 139, and orchestrator 138. The cloud-computing platform 128 can be a third-party cloud-based computing platform or a cloud-based computing platform operated by the same entity that operates the RAN. Cloud-computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new CU for test, orchestrator 138 can perform a pipeline of calling the CU code from a software repository incorporated as part of, or separate from cellular network 120, pulling corresponding configuration files (e.g. helm charts), creating Kubernetes nodes/pods, loading CU containers, configuring the CU, and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
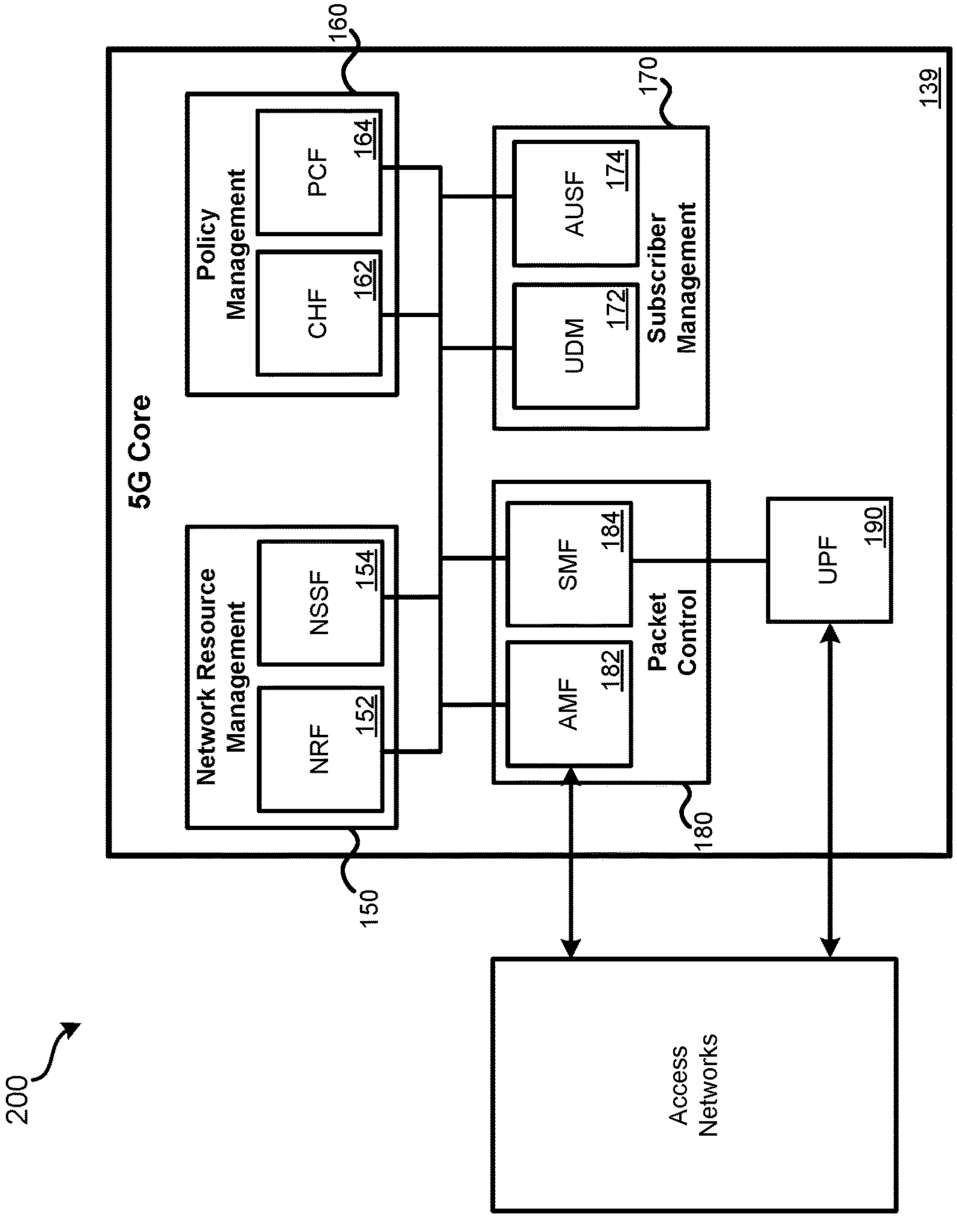
FIG. 2 illustrates an embodiment of a core of a hybrid cloud cellular network.
Figure 3:
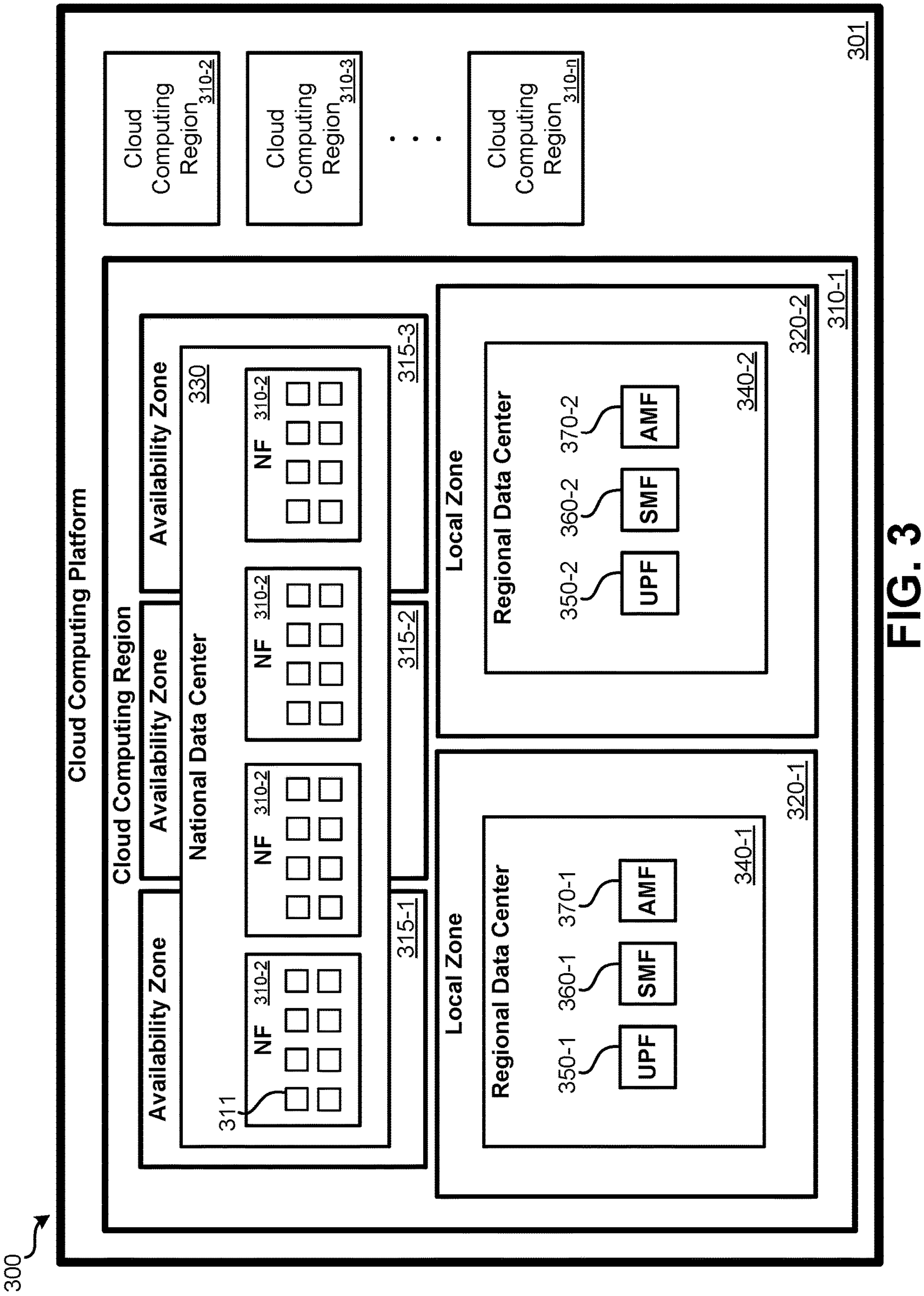
FIG. 3 illustrates an embodiment of a 5G core network topology on a public cloud-computing platform.

FIG. 2 illustrates a block diagram of a cellular network core, which can represent 5G core 139. 5G core 139 can be implemented on a cloud-computing platform. 5G core 139 can be distributed across multiple data centers, but logically understood as a central national data center (NDC) as detailed in relation to FIG. 3. 5G core 139 can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

The functions illustrated in FIG. 2 as part of 5G core 139 are merely exemplary. Many more or different functions may be implemented in the cellular network core and may vary by slice. The amount of computing resources devoted to a particular function can vary by slice.

FIG. 3 illustrates an embodiment of a cellular network core network topology 300 on a public cloud-computing platform. Cellular network core network topology 300 can represent how logical cellular network groups are distributed across cloud computing infrastructure of cloud computing platform 301. Cloud computing platform 301 can be logically and physically divided up into various different cloud computing regions 310. Each of cloud computing regions 310 can be isolated from other cloud computing regions to help provide fault tolerance, fail-over, load-balancing, and/or stability and each of cloud computing regions 310 can be composed of multiple availability zones, each of which can be a separate data center located in general proximity to each other (e.g., within 100 miles). Further, each of cloud computing regions 310 may provide superior service to a particular geographic region based on physical proximity. For example, cloud computing region 310-1 may have its datacenters and hardware located in the northeast of the United States while cloud computing region 310-2 may have its datacenters and hardware located in California. For simplicity, the details of the cellular network as executed in only cloud computing region 310-1 is illustrated. Similar components may be executed in other cloud computing regions of cloud computing regions 310 (210-2, 310-3, **310-*n***).

In other embodiments, cloud computing platform 301 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 310 may include multiple availability zones 315. Each of availability zones 315 may be a discrete data center or group of data center that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 315. For example, a database that is maintained as part of NDC 330 may be replicated across availability zones 315; therefore, if an availability zone of the cloud computing region is unavailable, a copy of the database remains up-to-date and available, thus allowing for continuous or near continuous functionality.

On a (public) cloud computing platform, cloud computing region 310-1 may include the ability to use a different type of data center or group of data centers, which can be referred to as local zones 320. For instance, a client, such as a provider of the hybrid cloud cellular network can select from more options of the computing resources that can be reserved at an availability zone compared to a local zone. However, a local zone may provide computing resources nearby geographic locations where an availability zone is not available. Therefore, to provide low latency, certain network components, such as regional data centers, can be implemented at local zones 320 rather than availability zones 315. In some circumstances, a geographic region can have both a local zone and an availability zone.

In the topology of a 5G NR cellular network, 5G core functions of 5G core 139 can logically reside as part of a national data center (NDC). NDC 330 can be understood as having its functionality existing in cloud computing region 310-1 across multiple availability zones 315. This arrangement allows for load-balancing, redundancy, and fail-over. In local zones 320, multiple regional data centers 340 can be logically present. Each of regional data centers 340 may execute 5G core functions for a different geographic region or group of RAN components. As an example, 5G core components that can be executed within an RDC, such as RDC 340-1, may be: UPFs 350, SMFs 360, and AMFs 370. While instances of UPFs 350 and SMFs 360 may be executed in local zones 320, SMFs 360 may be executed across multiple local zones 320 for redundancy, processing load-balancing, and fail-over.

Each network function can include multiple pods. A "pod" refers to a software sub-component of the network function, such as pod 311. This number is merely an example; fewer or greater numbers of pods may be part of the respective 5G core functions. It should be understood that in a real-world implementation, a cellular network core, whether for 5G or some other standard, can include many more network functions.

Figure 4:
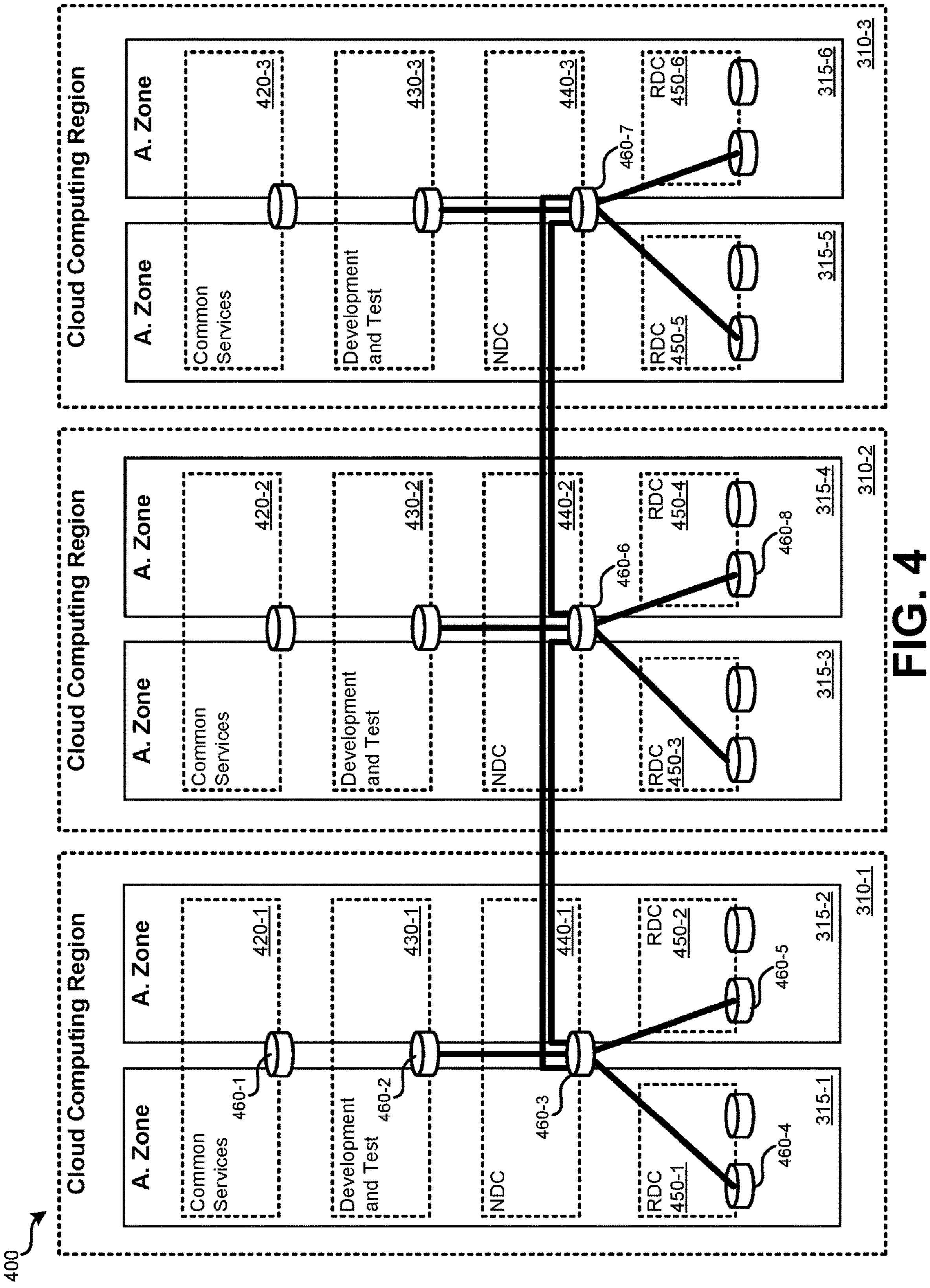
FIG. 4 illustrates an embodiment of a hybrid cloud cellular overlay network architecture.

FIG. 4 illustrates an embodiment of a hybrid cloud cellular overlay network architecture 400. Three cloud computing regions 310 are present. For simplicity, only two availability zones 315 are illustrated as part of each region of regions 310. In other embodiments, three, four, or more availability zones 315 may be present in each region of regions 310. As previously detailed, each of availability zones 315 may be a group of data centers that function in concert to provide redundancy and high availability.

In the illustrated embodiment, various virtual private clouds (VPCs) of NFs of the hybrid cloud cellular network are executed across multiple availability zones in each cloud computing region of cloud-computing regions 310: common services 420; development and test 430; national data center (NDC) NFs; and regional data center (RDC) NFs. Each VPC can include a cluster of one or more cellular network functions that are isolated from other functions and components of other VPCs. In order to enable flexible routing across multiple VPCs, availability zones and local zones, an overlay routing network may be implemented using virtual routers 460 that performs routing rather than relying on the cloud platform's underlying native routing. Further detail regarding the specific components of a virtual router is provided in relation to FIG. 5.

A virtual router may be instantiated such that it receives data from cellular network components (e.g., network functions) operating as part of a VPC (e.g., common services 420-1, development and test VPC 430-1, NDC 440-1, RDC 450-1); the virtual router then prioritizes and formats the data such that it is appropriate for transmission via the cloud computing platform. (In the embodiment of FIG. 4, RDCs 450 are implemented as separate VPCs within availability zones 315 rather than VPCs in a local zone.)

Routing prioritization can be performed on a cloud computing platform by using elastic network interface (ENI)-based QoS. At the hardware level of the cloud computing platform, network interfaces controllers (NICs) can recognize various priority tags (e.g., priority 1 and priority 2) on traffic. Virtual routers can set these priorities when congestion exists. Underlying limits or controls of the public cloud computing platform can limit a total amount of bandwidth between services. For instance, a maximum of five gigabytes per second between certain services of the hybrid cellular network may exist. When the amount of traffic approaches or exceeds this limit, priorities may be set on packets of the data traffic to ensure the higher-priority data is delivered timely. Multiple virtual routers can be used to work around these limits.

The underlying native routing architecture of the cloud computing platform, which includes physical routers, then performs the routing to the appropriate virtual router that is associated with another VPC of the hybrid cloud cellular network, which can be within the same availability zone, a different availability zone, or a different cloud-computing region altogether. The receiving virtual router reformats the received data and transmits it to the appropriate local component for which the data was addressed or labeled, or forwards to another virtual router based on the address or label. From the perspective of the cellular network operator, the virtual routers function as physical routers, such that no consideration needs to be given to the virtual router's underlying use of the cloud platform's native routing.

One or more virtual routers may be implemented for each VPC in a cloud computing region. For each of the VPCs in cloud computing region 310-1, one or more virtual routers may be present. For example, virtual router 460-1 can handle routing of data between common services 420-1 and other logical VPCs, both within cloud computing region 310-1 and with other cloud computing regions. Development and test VPC 430-1 can use virtual router 460-2. In this example, virtual router 460-2, based on a defined routing table, may route data via virtual router 460-3. Virtual router 460-3 may service NDC 440-1. Virtual router 460-3, based on its routing table, may route data to multiple other virtual routers, including: virtual router 460-4; virtual router 460-5; virtual router 460-6; virtual router 460-7.

Virtual routers 460 rely on the cloud-service's underlying native routing functionality; however, virtual routers 460 can use multi-protocol label switching (MPLS) with generic routing encapsulation (GRE) to overcome limitations of the cloud service's native routing. By using MPLS, rather than relying on addressing, a labeling system can be used to direct traffic, which can be useful for realtime, latency-sensitive applications, like a cellular network. For example, data received by virtual router 460-1 may be labeled as intended for RDC 450-4. Based on this label, virtual router 460-3 may route the data to virtual router 460-6. At virtual router 460-6, the same label may cause the data to be forwarded to virtual router 460-8.

Each virtual router can have some number, such as eight, GRE tunnels, per routing destination, which can be used to overcome a flow limit. Only an exemplary number of GRE tunnels are shown in FIG. 4 between virtual routers. For example, virtual router 460-3, based on a routing table, can serve to route received data from NDC 440-1 to virtual router 460-6 of NDC 440-2 based upon characteristics of the received data (e.g., an indicated destination, such as a destination address, an indication of where the data originated, a priority indicated in the received data, a type of the received data). Such routing may be used to exchange data across regions 310-1 and 310-2 for NFs executed as part of the NDC layer 440 of the cellular network. (Therefore, NDCs 440-1, 440-2, and 440-3 can be understood to be logically a single NDC.) Since the virtual routers can use GRE tunnels, limitations of the underlying cloud computing platform routing architecture regarding prioritization, routing protocols, and IP addresses being reused in different availability zones 315 and/or cloud computing regions 310 can be worked around.

Further, virtual routers can perform forwarding to other virtual routers if a direct route is not available. If a GRE tunnel does not exist directly for a particular route, one or more intermediary virtual routers can be used for forwarding. As an example, if data is to be transmitted from development and test layer 430-1 to RDC 450-2, virtual router 460-2 may transmit the data to virtual router 460-3, which can then route the data to virtual router 460-5.

A given VPC may have more than one virtual router. For example, each RDC of RDCs 450 may have multiple virtual routers. Having multiple virtual routers can help if large volumes of data need to be transmitted.

It may not be necessary to establish GRE tunnels between each and every virtual router pair. For example, in a cellular network, the network functions as a hierarchy. Therefore, higher level NFs tend to communicate with lower-level NFs arranged in the hierarchy. As an example of this arrangement, virtual router 460-4 may need to have a GRE tunnel with virtual router 460-3 of NDC 440-1, but not directly with virtual router 460-6 of NDC layer 440-2 due to no or limited traffic occurring between these virtual routers on the hybrid cloud cellular network.

Figure 5:
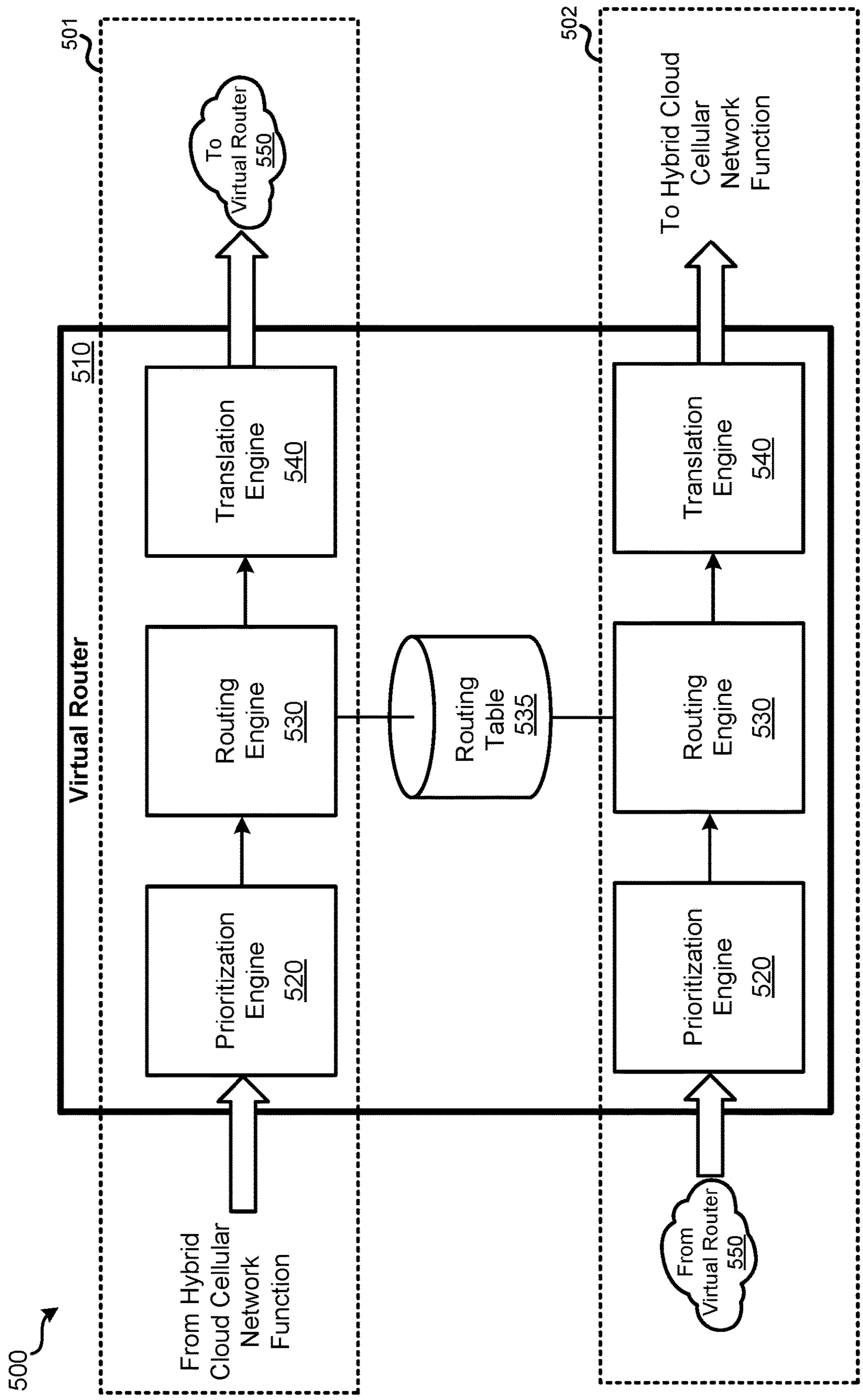
FIG. 5 illustrates an embodiment of a virtual router for use as part of a hybrid cloud cellular overlay network.

FIG. 5 illustrates an embodiment 500 of a virtual router for use as part of a hybrid cloud cellular overlay network. In embodiment 500, virtual router 510 can be mapped to a particular network function or group of network functions within a VPC. Data output from this network function is routed to another destination via virtual router 510. Data address to this network function is received by virtual router 510 and provided to the network function. Virtual router 510 can include: prioritization engines 520; routing engines 530; routing table 535; and translation engines 540.

Virtual router 510 is implemented as a software component that is executed on the public cloud computing platform within a VPC of the hybrid cellular network. Based on restrictions set on the cloud computing platform, a maximum amount of bandwidth may be used by an individual software component, such as 5 GB/s. In situations where this amount of bandwidth is insufficient, multiple instances of virtual routers may be implemented and may be mapped to a same network function (or group of network functions in a VPC), thus increasing the total available bandwidth, such as to 10 GB/s for two virtual routers. Therefore, if one of the virtual routers reaches its maximum bandwidth, another virtual router may be used for fail over of additional traffic.

Prioritization engine 520 may serve to prioritize particular data being transmitted or received over other data. If virtual router 510 has sufficient bandwidth and resources available that all data being received or transmitted can be handled, no prioritization may need to be performed and data may be processed in the order in which it was received. However, if virtual router 510 reaches its bandwidth limit, data that is tagged with a greater priority is prioritized over data that does not have such a tag. For example, if virtual router 510 is operating at its maximum permitted bandwidth and prioritization engine 520 identifies data with the higher priority, the higher priority data is prioritized for transmission over the data with the lesser priority. The data with the lesser priority may be rejected or, if multiple virtual routers are mapped to the network function, the data with the less priority may be passed to the second virtual router for routing.

Such a second virtual router may also prioritize any data it receives for routing that is labeled with the greater priority. Again here, this prioritization may not matter if the second virtual router is operating below its maximum bandwidth and all data may be routed in the order received. However, if it is operating at its maximum bandwidth, the data with the higher priority is routed first, with other data with the lower priority either being cached and delayed, rejected for routing, or provided to yet another virtual router for routing.

After analysis for priority, routing engine 530 may use routing table 535 to determine to where received data is to be routed and the path along which it should be routed (e.g., via other virtual routers and possibly physical routers). Routing table 535 may be maintained via a master account of the hybrid cloud cellular network on the public cloud computing platform. The master routing tables may be propagated to the appropriate instances of components instantiated on the public cloud computing system for the hybrid cellular network. Virtual router 510 may use multi-protocol label switching (MPLS) to perform routing. Therefore, virtual router 510 allows for data packets to be forwarded at level 2 of the open systems interconnection (OSI) model. Rather than analyzing a destination IP address of a packet, MPLS allows for a first router that receives a data packet (which might be virtual router 510) to define the entirety of a path to a destination and indicate the path in a label stored as part of the packet header. (The same label may be used for indicating which packets are to be prioritized.) Translation engine 540 may properly formulate the MPLS label, which can include the indication of the label-switched path and the priority.

If multiple hops are needed for delivery of data, the label at the "ingress" router, which may be virtual router 510, can add a label that defines a path to a destination router mapped to a network function or component of the RAN. The path can be a series of virtual and/or physical routers that are communicatively connected with each other in series. One or more routers, which may be virtual routers, that are located along the path route the data packet according to the path defined in the label. A destination router, which can be referred to as an "egress" router (which also may be a virtual router) can receive the data packet and remove the label before the data packet is delivered to the destination network function or RAN component.

Box 501 illustrates how virtual router receives data from a mapped network function or group of network functions within a VPC and routes the data to another virtual router 550. Box 502 illustrates the opposite scenario: data is received from another virtual router (e.g., virtual router 550), then prioritization engine 520 analyzes the priority of the received data packet such that the data packet is processed based on its priority as previously detailed. Routing engine 530 may analyze the label of the MPLS header to determine if the data packet is to be routed to another virtual router or if virtual router 510 is the data packets egress router. If the data packet is to be routed on to another router, translation engine 540 may not modify the packet. If virtual router 510 is the egress router, translation engine 540 can remove the MPLS header and provide the data packet to the mapped network function or group of network functions within the VPC in which virtual router 510 resides.

If a virtual router hit its maximum bandwidth, for received packets that cannot be processed, a return message may be sent to the source (e.g., the previous router in the path) an indication that it cannot accept a packet. This previous router, in response to receiving the return message indicating that the virtual router was unavailable, can reroute data to another destination (e.g., another destination network function that performs the same function as the initially intended network function.

Figure 6:
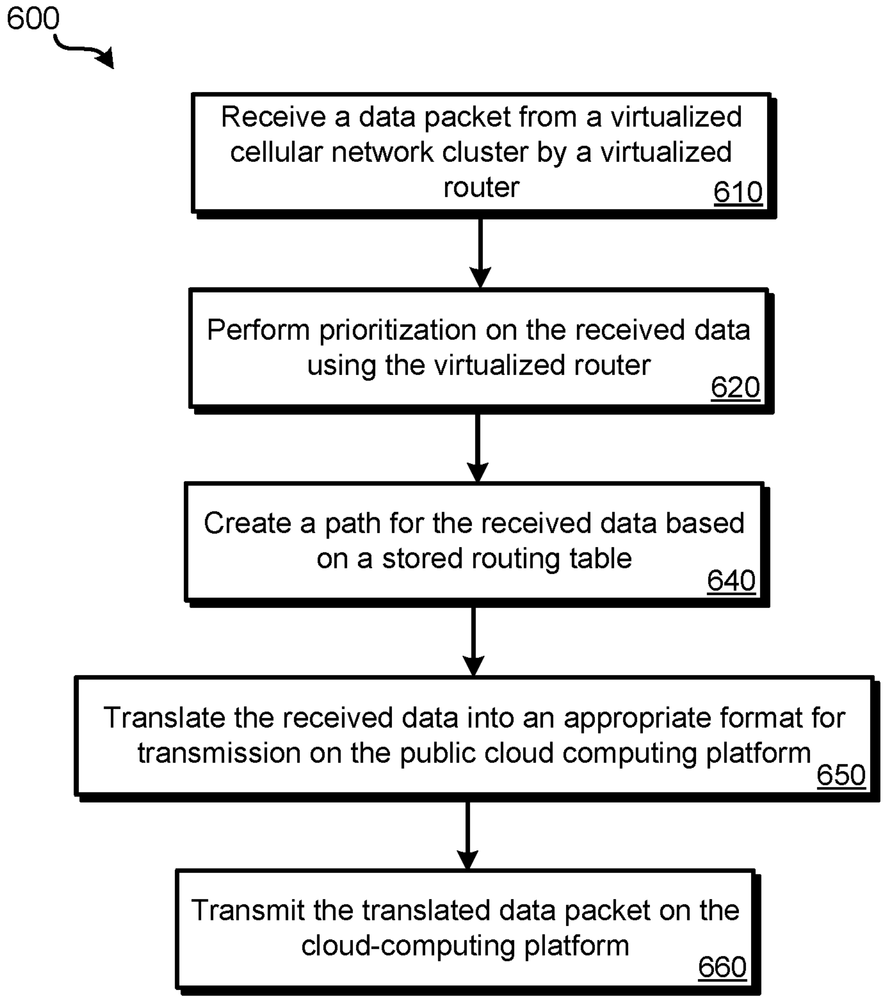
FIG. 6 illustrates an embodiment of a method for using a virtual router on a hybrid-cloud cellular network overlay network to transmit data via the native routing infrastructure of a cloud computing platform.

Various methods may be performed using the systems and arrangements of FIGS. 1-5. FIG. 6 illustrates an embodiment of a method 600 for using a virtual router on a hybrid-cloud cellular network to transmit data via the native routing infrastructure of a cloud computing platform. Method 600 can be implemented on hybrid cloud cellular network 120 of FIG. 1 (which is further detailed in FIGS. 2 and 3). Hybrid cloud cellular network 120 may be logically organized the same or similar to hybrid cloud cellular overlay network architecture 400 of FIG. 4. Individual virtual routes may be as detailed in relation to FIG. 5.

FIG. 6 and method 600 is focused on a virtual router receiving outbound data from a cellular network VPC operating on a cloud computing platform. The outbound data is to be routed to another virtual router existing elsewhere on the cloud computing platform. Referring to FIG. 4, the other virtual router is part of a separate cellular network VPC, which may operate the same or a different cloud computing availability zone and/or can operate in a different cloud computing region.

At block 610, the data to be routed is received from a NF within a VPC executed on the cloud computing platform. The cellular network VPC may include, for example, be (or be part of) an NDC, RDC, common services VPC; or development and test VPC. In some embodiments, the first virtualized router creates a label (as indicated at block 640) based on the NF from which the data was received and, possibly, characteristics of the data to indicate a path to a destination NF or RAN component. In some embodiments, a NF may create the label instead of the virtual router.

At block 620, a determination may be made by the virtual router as to whether the received data should be prioritized over other received data for routing. In a cellular network implementation, data associated with emergency services, such as 911 calls, AMBER alerts, 911 texts, and other forms of emergency notifications may be required, such as by law, to be prioritized over normal communication traffic. Based upon an indication of priority of the received data (which could be an indication in the MPLS label indicating that the data is to be prioritized), the virtualized router performs prioritization. If the data is prioritized, it may be routed before other data that is not be prioritized if the virtual router is operating at its maximum bandwidth.

At block 640, based on the routing table accessible by the virtual router, a path is determined. The received data may then have a label attached that indicates the path for routing to the destination. The path may be a single hop to a destination router with which the virtual router is in communication or may involve multiple hops through one or more additional virtual and/or physical routers. The determined path is indicated in the MPLS label such that other routers can analyze the label to determine any additional routing that is to be performed.

At block 650, the received data packet may be translated into a form appropriate for transmission on the public cloud computing platform. GRE may be used such that many various network layer protocols can be accommodated and routed via the underlying native routing architecture regardless of which particular protocols the underlying native routing architecture supports directly. As previously detailed, the virtual routers can use segment routing multi-protocol label switching (SR-MPLS) schema for routing on the public cloud computing platform. The virtual routers forward packets using a source routing model, meaning that the source specifies the route along which packets take through a network. Further, packet forwarding can be divided into different segments, allocate segment identifiers (SIDs) to the segments, and encapsulate segment information into packets at the ingress of the path to guide packet forwarding.

At block 660, the virtual router can transmit the translated data via the native routing architecture of the cloud-computing platform. The native routing architecture can then deliver the formatted data as indicated by the routing performed at block 640, which will cause the formatted data to be delivered to another virtual router, which may be in the same or a different cloud-computing subregion and, possibly, may be in a different cloud computing region.

Figure 7:
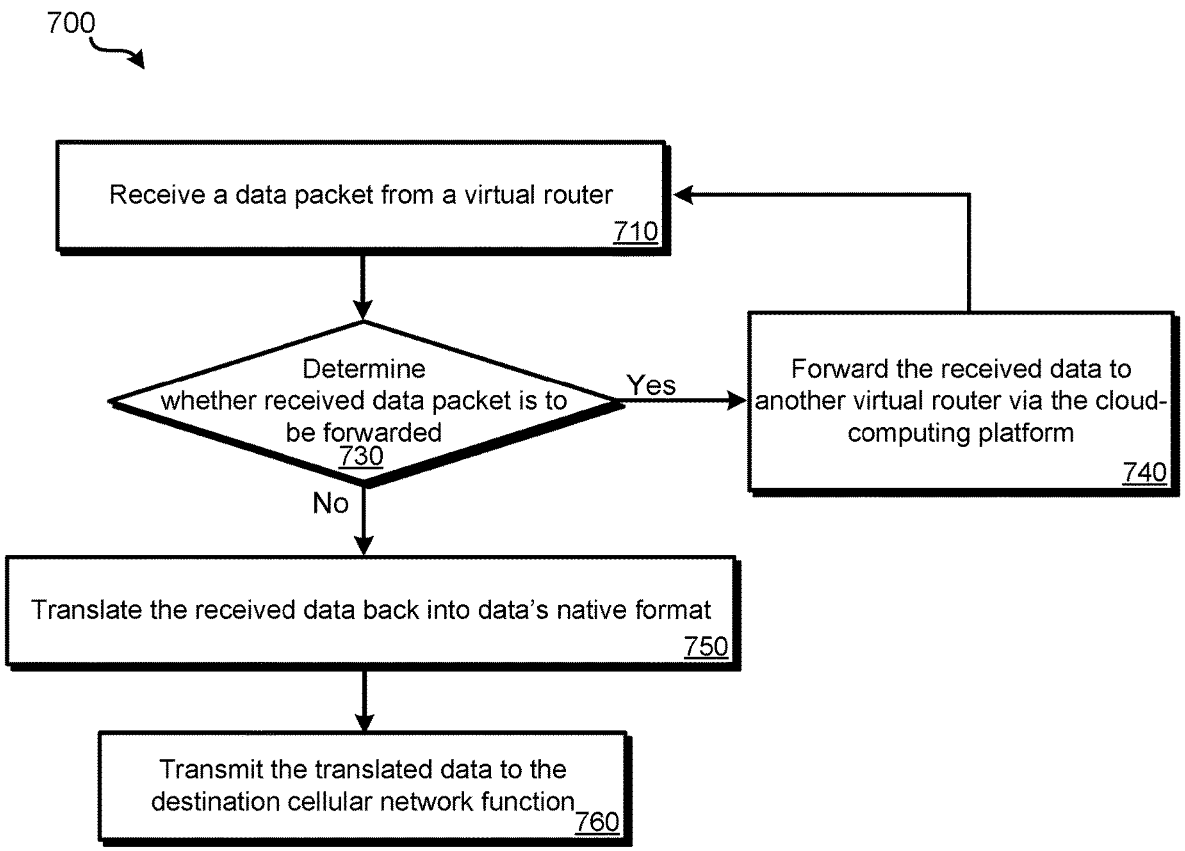
FIG. 7 illustrates an embodiment of a method for using a virtual router on a hybrid-cloud cellular network overlay network to receive data from the native routing infrastructure of a cloud computing platform.

FIG. 7 illustrates an embodiment of method 700 for using a virtual router on a hybrid-cloud cellular network overlay network to receive data on the public cloud computing platform. Rather than using the public cloud computing platform's native routing architecture, virtual routers are deployed to provide the hybrid cellular network with direct control over packet routing, including packet prioritization. The virtual router that performs method 700 can be instantiated as a software component or service on the public cloud computing platform. Method 700 may be performed by another virtual router that is part of the hybrid cloud cellular network and is receiving data that was transmitted via the native routing architecture of the cloud computing platform by a virtual router that performed method 600. The router that performs method 700 can be part of a different VPC than the virtual router that performed method 600.

At block 710, a virtual router receives a data packet on the public cloud computing platform as transmitted by another virtual router (or physical router) of the hybrid cellular network. At block 730, a determination is made as to whether forwarding to another virtual routed is necessary at block 730 based on a label of the data packet. If the label of the data packet, as analyzed, specifies that the data packet is to be forwarded to another virtual router, block 740 is performed. At block 740, the data packet is forwarded to another virtual router via the cloud-computing platform. Method 700 can then return to block 710, which may then be performed by the virtual router that has received the forwarded data packet.

Alternatively, the determination of block 730 can be that the receiving virtual router is the egress virtual router and that no forwarding to another virtual router is to be performed. At block 750, the received data is translated back from the format used by the virtual routers (MPLS with GRE) to the data packet's format prior to routing. Any prioritization of the data indicated in the label, such as for a 911 call or AMBER alert, may be maintained with the data.

At block 760 the translated data packet is provided to a network function mapped to the virtual router or a group of network functions within the destination VPC in which the virtual router is executed. Block 760 can include the translated data being passed to the mapped network function of the virtual router for further processing. Effectively, virtual routers allow network functions residing in different logical VPCs of the hybrid cloud cellular network to communicate with each other, while using data prioritization, regardless of the availability zone or local zone in which the logical VPCs are located.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A hybrid cloud cellular network, comprising:
- a plurality of base stations, each base station of the plurality of base stations comprising:
  - a radio unit (RU);
  - a router; and
  - a distributed unit (DU); and
- a cellular network cluster comprising a plurality of network functions, wherein the cellular network cluster is implemented on a cloud computing platform and communicates with a plurality of DUs of the plurality of base stations, the cellular network cluster comprising:
  - a virtual router, implemented on the cloud computing platform, configured to:
    - receive a data packet from the cellular network cluster and
    - route the data packet to a second virtual router of a plurality of virtual routers implemented on the cloud computing platform, wherein:
      - the virtual router and the second virtual router are configured to function as an overlay on the cloud computing platform's underlying native routing architecture;
      - the virtual router and the second virtual router are located within a same logical national data center (NDC);
      - the virtual router and the second virtual router are located within different cloud computing regions of the cloud computing platform;
      - the virtual router is configured to analyze a label of the data packet;
      - the virtual router prioritizes routing of the data packet on the cloud computing platform to the second virtual router based on the label of the data packet; and
      - the second virtual router is configured to forward the data packet, based on the label, to a third virtual router operating at a regional data center (RDC).

2. The hybrid cloud cellular network of claim 1, wherein the virtual router comprises a prioritization engine, configured to:
- analyze the received data packet; and
- prioritize the data packet based on the label of the data packet, wherein prioritizing the data packet comprises delivering the data packet ahead of a second data packet having a lesser priority.

3. The hybrid cloud cellular network of claim 2, wherein the assigned priority is based on the data packet comprising data for a wireless 911 call.

4. The hybrid cloud cellular network of claim 1, wherein the virtual router comprises a routing table that defines where data packets are to be routed based on a characteristic of the data packets.

5. The hybrid cloud cellular network of claim 1, wherein the virtual router is configured to use multiprotocol label switching (MPLS) to route the data packet.

6. The hybrid cloud cellular network of claim 5, wherein the virtual router is further configured to use generic routing encapsulation between the virtual router and the second virtual router located in a second cellular network cluster on the cloud computing platform.

7. The hybrid cloud cellular network of claim 1, wherein the virtual router is implemented as code that is loaded by a cellular network operator onto the cloud computing platform, the code being mapped to a user account of the cellular network operator with the cloud computing platform.

8. The hybrid cloud cellular network of claim 1, wherein the cellular network cluster is a logical national data center (NDC) of the hybrid cloud cellular network.

9. The hybrid cloud cellular network of claim 1, wherein the cellular network cluster is a logical regional data center (RDC) of the hybrid cloud cellular network.

10. The hybrid cloud cellular network of claim 1, further comprising:

a second cellular network cluster comprising a second plurality of network functions, wherein the second cellular network cluster is implemented on the cloud computing platform, the second cellular network cluster comprising:

the second virtual router, wherein the second virtual router is configured to:

receive the data packet from the virtual router via the cloud computing platform;

reformat the received data packet; and output the reformatted received data packet to the second cellular network cluster.

11. The hybrid cloud cellular network of claim 1, wherein the hybrid cloud cellular network is a 5G New Radio (NR) radio access technology (RAT) cellular network.

12. A method for implementing an overlay network on a public cloud computing platform, the method comprising:

creating a plurality of virtual routers executed at different cloud computing regions of the public cloud computing platform, wherein:

the plurality of virtual routers function as an overlay on the public cloud computing platform's underlying native routing architecture;

a first virtual router and a second virtual router of the plurality of virtual routers are located within different cloud computing regions of the public cloud computing platform; and the virtual router and the second virtual router are located within a same logical national data center (NDC);

receiving a data packet by the first virtual router of the plurality of virtual routers;

formatting the received data packet for transmission to a different cloud computing region of the public cloud computing platform by applying a label that defines a path to a network function (NF) at the different cloud computing region;

receiving the formatted data packet by the second virtual router of the plurality of virtual routers located in the different cloud computing region, wherein the first virtual router causes the formatted data packet to be transmitted to the second virtual router;

forwarding the formatted data packet, based on the label, to a third virtual router operating at a regional data center (RDC); and reformatting the received formatted data packet by the third virtual router for use at the RDC at the different cloud computing region of the public cloud computing platform.

13. The method of claim 12, wherein the overlay network functions as part of a 5G New Radio (NR) cellular network that is partially implemented on the public cloud computing platform.

14. The method of claim 12, where each virtual router of the plurality of virtual routers uses generic routing encapsulation (GRE) to create GRE tunnels with other virtual routers of the plurality of virtual routers.

* * * * *